United States Patent Office 3,005,511
Patented Oct. 24, 1961

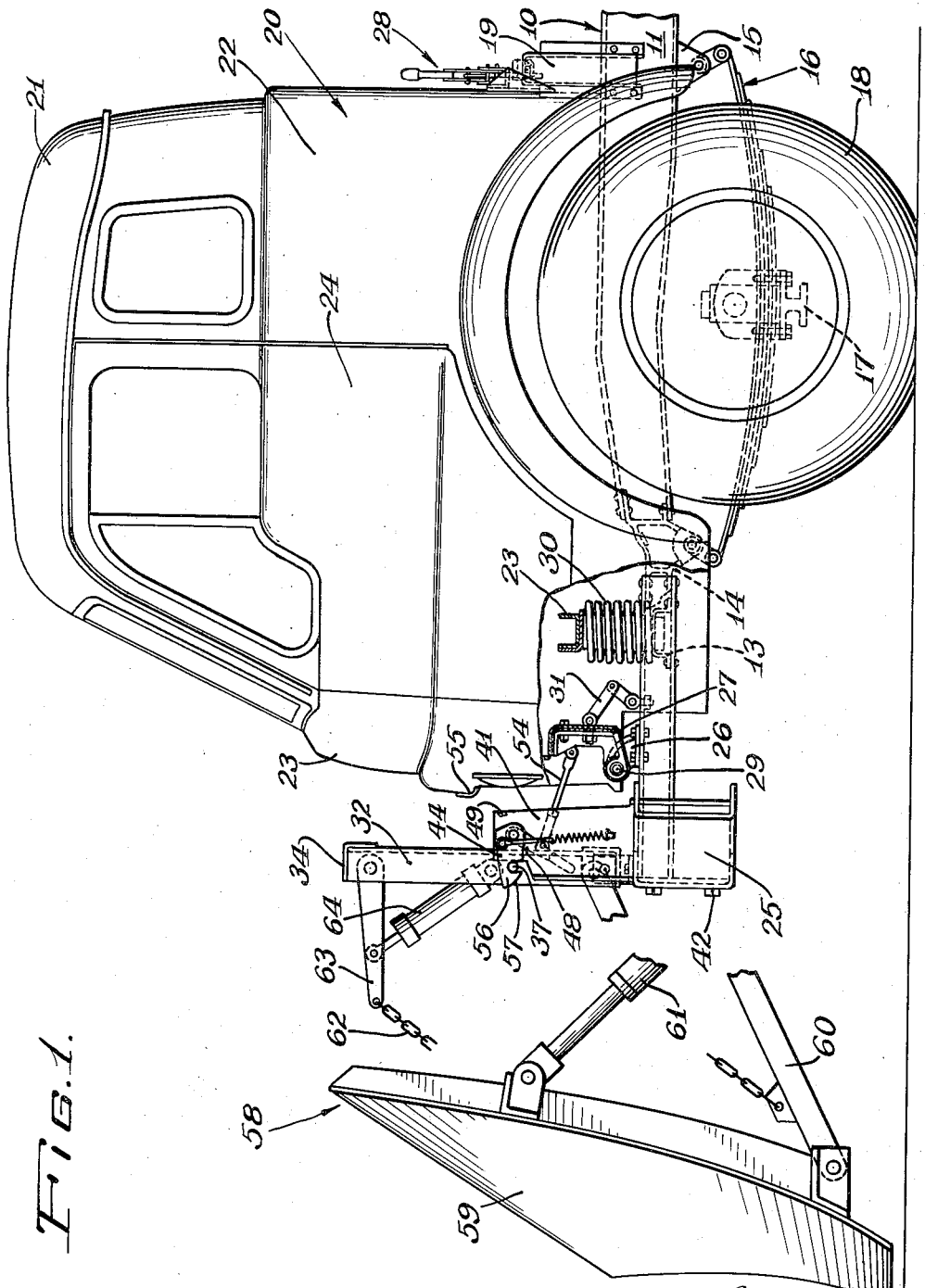

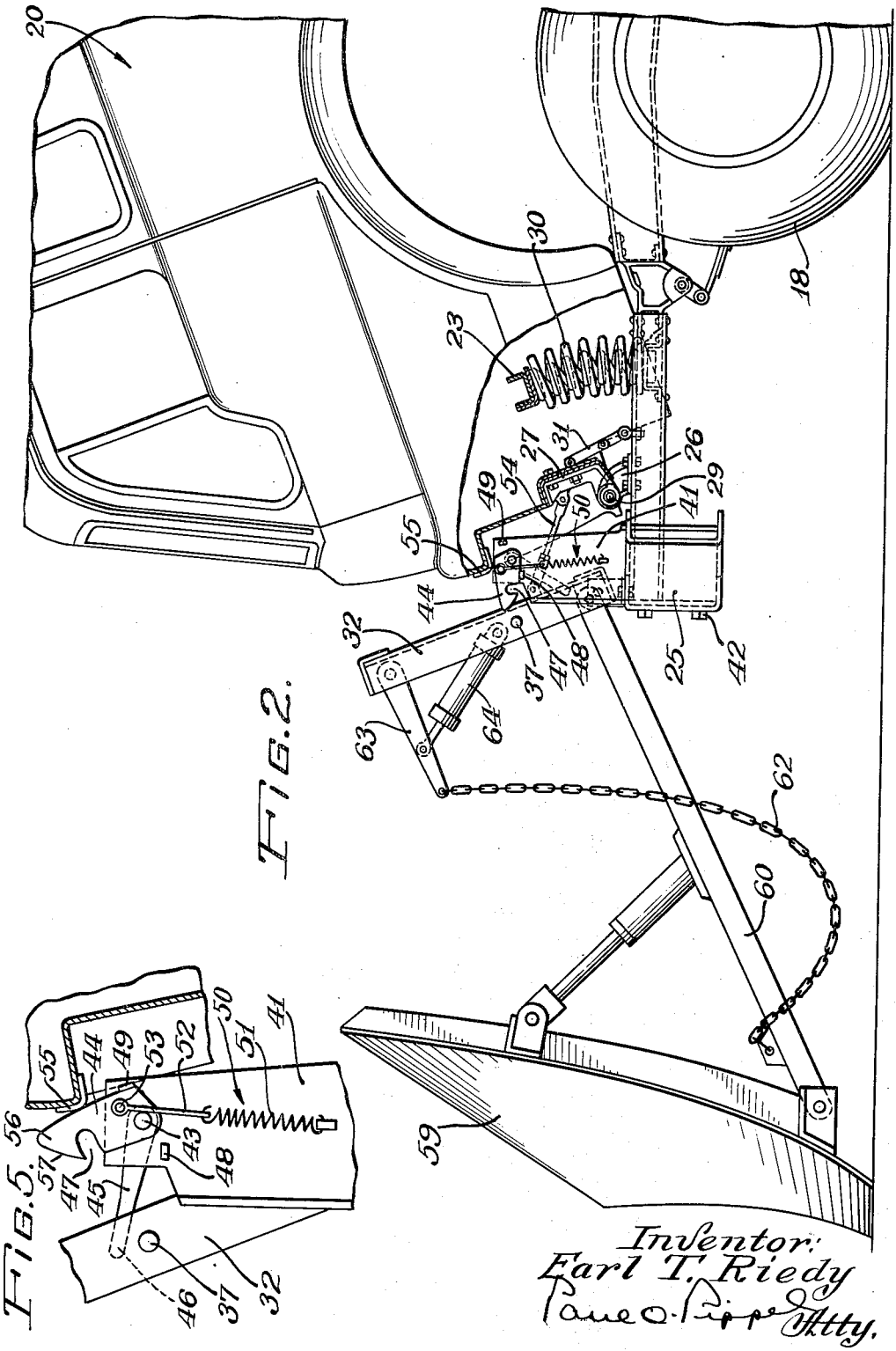

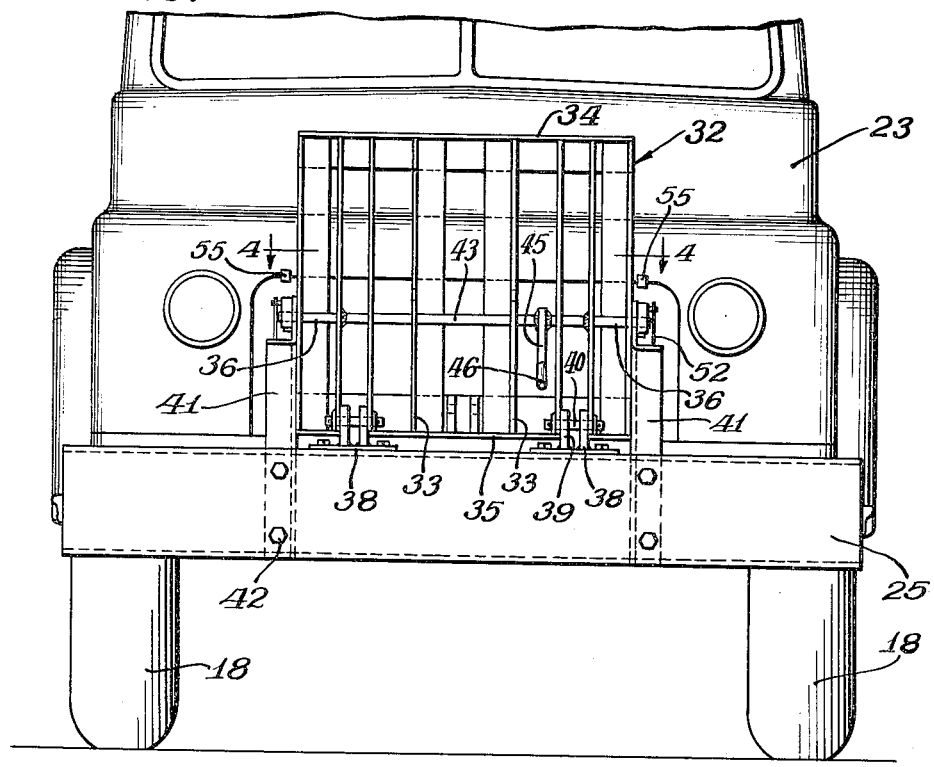
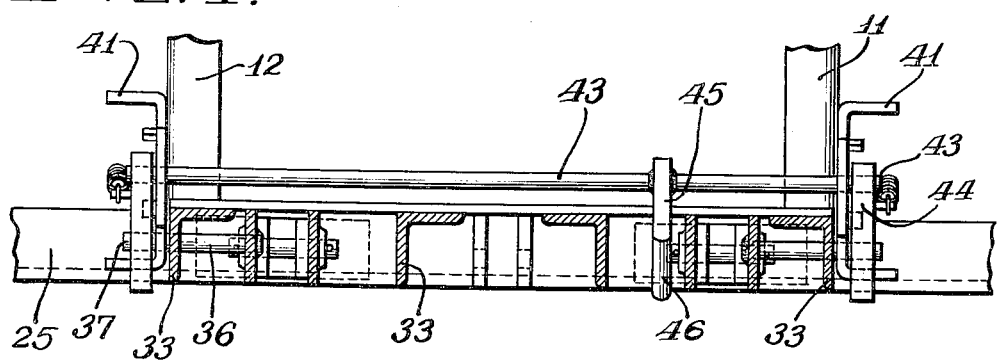

3,005,511
GRILLE GUARD AND IMPLEMENT MOUNTING MEANS FOR MOTOR TRUCKS AND THE LIKE
Earl T. Riedy, Fort Wayne, Ind., assignor to International Harvester Company, Chicago, Ill., a corporation of New Jersey
Filed Jan. 17, 1958, Ser. No. 709,507
3 Claims. (Cl. 180—89)

This invention relates to a new and improved means for mounting a combination grille guard and implement support structure on a motor truck and more particularly to a combination grille guard and implement support structure and the means for mounting the same forwardly of a cab of a cab-over-engine type motor vehicle capable of tilting forwardly to gain access to the engine.

It is well known that cab-over-engine type motor trucks wherein the operator's compartment is disposed over the vehicle propulsion engine possess many distinct advantages over conventional motor trucks such as more payload capacity, better weight distribution, and greatly increased maneuverability because of a shorter radius of turning and for getting around sharp corners of narrow streets and alleys and easier parking. However, prior to the commercial introduction of forwardly tilting cabs, servicing of the engine of COE type motor trucks was extremely difficult and time consuming. With the advent of the forwardly tilting cab, complete accessibility of the engine for servicing was obtained.

Oftentimes because the vehicle cab is constructed of relatively light sheet metal and the forward end thereof is highly susceptible to accidental damage, a heavy grille guard is rigidly connected to the chassis frame and disposed forwardly of the forward wall of the cab. It will be appreciated that conventional means for rigidly securing grille guards to the forward end of conventional motor trucks, as distinguished from those wherein the cab is tiltable to gain access to the engine which is mounted beneath the cab cannot be employed because the grille guard would interfere with the tilting movement of the cab. It is, therefore, one of the primary objectives of the present invention to provide a grille guard which is rigidly connected to and immovable with respect to the vehicle chassis frame of a tiltable cab type motor truck when the cab is in its lowered or engine enclosing position, but which is capable of tilting with the cab when the same is pivoted with respect to the chassis frame to gain access to the engine for servicing thereof.

While motor trucks are generally employed for transporting cargo and the like, they are often utilized as street and highway maintenance vehicles. When used as street and highway maintenance vehicles, snow plows, sweepers, and other like implements are mounted on the front end of the trucks. It is obvious that a like problem as the problem noted above with respect to mounting a grille guard on a forwardly tilting cab type motor vehicle exists in mounting a street and highway maintenance implement since the implements must be rigidly supported by the vehicle chassis frame rather than the relatively light constructed vehicle cab when being used, but which will not interfere with the tilting operation of the cab when it is desired to service the vehicle engine. It is, therefore, another important object of the present invention to provide an implement support frame to which implements may be attached thereto in a conventional manner which support frame is rigidly secured to the vehicle chassis frame when the tiltable cab is in its normal lowered position but which rigid connection is capable of being quickly released whereby the support frame may pivot with the vehicle cab with respect to the chassis frame.

A still further object is the provision of a grille guard construction for a forwardly tilting cab type of motor truck to which implements such as snow plows, sweepers, and the like may be readily attached.

The foregoing objects and other desirable features inherent in and encompassed by the invention together with many of the purposes and uses thereof will become readily apparent from a reading of the ensuing description in conjunction with the annexed drawings in which:

FIGURE 1 is a side elevational view of the forward end of a tilt cab type cab-over-engine motor truck embodying the invention; the cab is shown in its lowered or engine enclosing position and portions thereof are broken away and in section to better illustrate the invention;

FIGURE 2 is a view similar to FIGURE 1 illustrating the cab in its raised position;

FIGURE 3 is a front elevational view of the motor truck shown in FIGURE 1 with the snow plow and the structure interconnecting the snow plow with the supporting frame eliminated;

FIGURE 4 is a sectional view taken substantially along line 4—4 of FIGURE 3; and FIGURE 5 is an enlarged detail view of one of the latches in its unlocked position.

Referring to the drawings in detail, wherein like reference characters represent like elements throughout the various views, there is shown the forward portion of a motor truck chassis frame 10 which includes a pair of transversely spaced longitudinal extending side sill members 11 and 12 which are interconnected along their lengths by a plurality of cross members, one such cross member 13 being shown in FIGURES 1 and 2.

The rearwardly disposed end (not shown) of the chassis frame 10 is supported off the ground by power driven ground-engaging wheels which are resiliently connected thereto by spring means (not shown) in a conventional manner. Attached to each sill member 11 and 12 at a point spaced longitudinally rearwardly from the extreme forward end thereof is a bracket 14. Similarly each side sill member 11 and 12 is provided with a bracket 15 spaced rearwardly from a respective bracket 14. One end of a leaf spring assembly, designated generally by numeral 16, is operably connected to each bracket 14 and its opposite end is similarly operably connected to a respective bracket 15. Spring assemblies 16 are rigidly connected to a transversely extending axle 17 on which steerable ground-engaging wheels 18 are rotatably mounted.

The vehicle power plant or engine (not shown) is resiliently mounted adjacent the forward end of the chassis frame 10 and medially thereof. An arched cross brace 19 spans the chassis frame 10 and has its opposite ends rigidly secured to a respective side sill member 11, 12. The arched cross brace 19 serves as a rear support for the vehicle body or operator's compartment 20.

The operator's compartment 20 includes a roof 21 joined to depending side panels 22 and a front section 23. A pair of doors 24 are suitably pivotally mounted to the front section 23. It is to be understood that suitable braces and ribs are used to interconnect the various body parts enumerated above to increase the strength and rigidity of the assembled operator's compartment 20. Running the transverse width of the operator's compartment 20 on the underside thereof is a U-shaped cab frame member 23. For the purpose of the present invention, the cross brace 19, as well as a transversely extending U-shaped bumper 25, suitably secured to the front extremities of the side sill members 11 and 12, is considered as a part of the chassis frame 10.

Mounted on the top side sill member 11 adjacent the front end thereof is a hinge member 26. A similar member (not shown) is mounted on the side sill member 12 in transverse alignment with the hinge member 26. Rigidly fastened to the lower front edge of the operator's compartment 20 are a pair of transversely spaced hinge members 27 which cooperate with the hinge members 26 and are hingedly connected thereto whereby the operator's compartment 20 is capable of pivoting with respect to the chassis frame 10 about a transversely extending horizontal axis from the position shown in FIGURE 1 to the position shown in FIGURE 2.

Normally the operator's compartment 20 is in the position shown in FIGURE 1 wherein the front end thereof is supported by the chassis frame pin through the intermediary of the hinge members 26 and the rear end thereof is supported by the chassis frame 10 through the intermediary of the arched cross brace 19. Suitable latch means designated generally by numeral 28 are provided for latching the operator's compartment 20 to the cross brace 19. When the latch mechanism is released, the cab is free to be swung forwardly about the pivotal axis defined by the pivot pins 29 interconnecting each pair of hinge members 26, 27. In order to mitigate the effort required to manually swing the operator's compartment 20 forwardly, a pair of helically wound counterbalancing springs 30 are provided which have one end reacting against and fixed to the cross member 13 and their opposite ends reacting against and fixed to the cab frame cross member 23. With the cab in its normal position as shown in FIGURE 1, the springs 30 are compressed. However, when the latch mechanism 28 is released, the springs 30 are permitted to expand and thus very little effort is required on the part of the operator to raise and tilt the cab forwardly. A pair of articulated links 31 each having one end pivotally connected to a respective side sill member 11, 12 and its opposite end pivotally connected to a hinge member 27 are provided to limit the forward swing of the operator's compartment 20 from the position shown in FIGURE 1.

A radiator grille guard, designated generally by numeral 32, is adapted to be supported on the bumper 25 medially of the side sill members 11 and 12. The grille guard 32 includes a plurality of transversely spaced vertically extending bars 33 having their upper ends welded to a top bar 34 and their lower ends similarly welded to a bottom bar 35. Welded to each side vertical bar 33 and the next adjacent vertical bar is a latch pin 36. One end 37 of each latch pin 36 extends horizontally laterally outwardly from a respective side vertical bar 33 as illustrated in FIGURE 4.

Rigidly fastened to the top flange of the bumper 25 are a pair of transversely spaced bearing supports 38. Each bearing support 38 is provided with a pair of upright legs 39 which extend through cutouts in the bottom bar 35 and are provided with transversely aligned apertures therethrough for rotatively journalling a pivot pin 40 carried by two adjacent vertical bars 33. From the foregoing it will be appreciated that the grille guard 32 is supported on the chassis frame 10 and is capable of pivoting relatively thereto about a horizontal transversely extending axis spaced vertically above the bumper 25.

Extending vertically through the rearwardly extending flanges of the bumper 25 are a pair of transversely spaced substantially U-shaped upright members 41. The upright members are rigidly secured to the bumper 25 and the side sill members 11 and 12 by means of bolts 42 and other brackets, braces, and fastening means not shown. Extending transversely through and rotatably supported by the plate-like upper ends of the upright members 41 is a latch release rod 43. Each end of the rod 43 extends outwardly of a respective plate-like portion and has one end of a latch member 44 rigidly connected thereto. An arm 45 has one end rigidly connected to the rod 43 and has its other end in the form of a hand grip portion 46 which is disposed between a pair of vertical bars 33 so as to be conveniently gripped by the hand of the operator to rock the rod 43 and thus the latch members 44 in unison. Each latch member 44 is provided with an open end slot 47 extending upwardly from the lower edge thereof as viewed in FIGURE 1. The surfaces of the latch member 44 defining the sides of the slot 47 are spaced a distance equal to or slightly greater than the diameter of the latch pins 36 and the closed ends of the slots 47 have semi-circular configurations conforming to the exterior surface of the latch pins whereby when the ends 37 of the latch pins 36 are disposed within the slots 47 and are seated on the semi-cylindrical bottoms of the slots, the grille guard 32 is maintained in a fixed upright position as shown in FIGURE 1. From the foregoing it will be appreciated that the grille guard 32 is supported in its normal upright locked position on the chassis frame 10 by means of the bearing supports 38 and pivot pins 40 and latch members 44 and latch pins 36.

As best shown in FIGURE 1, each latch member 44 has associated therewith stop means for limiting the arc of swing thereof. The stop means are in the form of a pair of outwardly extending lugs 48, 49. The lugs 48 and 49 project outwardly from and are secured to each plate-like portion and are adapted to engage the lower edge and the upper edge respectively of the latch member to thus limit the rocking movement of the latch member. When the lower edges of the latch members 44 are in engagement with the stop lugs 48, and the grille guard 32 is in its upright position as shown in FIGURE 1, the latch pin ends 37 are engaging the semi-cylindrical bottom surfaces of the slots. When it is desired to unlock the grille guard 32 so as to permit the same to pivot with respect to the chassis frame 10, the hand grip portion 46 of the arm 45 is raised, as viewed in FIGURE 1, to rock the latch release rod 43 and the latch members 44 in a clockwise direction until the upper edge surfaces of the latch members 44 engage the stop lugs 49. A pair of overcenter spring devices designated generally by numeral 50 are employed for yieldably maintaining the latch members 44 into abutting engagement with either the stop lugs 48 or the lugs 49. Each overcenter spring device includes a helically wound tension spring 51 having one end connected to a respective upright member 41 at a point spaced vertically below and in vertical alignment with the axis of the latch release rod 43. The opposite end of the spring 51 has one end of a link 52 connected thereto and its opposite end in turn connected to a respective latch member 44 at a point 53 spaced intermediate the pivotal axis of the rod 43 and the slot 47 formed in the latch member. As shown in FIGURE 1, the spring 51 is resiliently urging the latch member 44 into engagement with the stop lug 48. However, when the latch members 44 are rocked to their fully released positions wherein they engage the stop lugs 49, the points 53 are located on the side of a vertical plane containing the pivotal axis of the rod 43 opposite to the side when the latch members are abutting the lugs 48. Consequently, the action of the springs 51 then tends to resiliently urge the latch members 44 into engagement with the lugs 49.

The grille guard 32 is also connected to the operator's compartment 20 by means of a pair of longitudinally extending rods 54, one of which is shown in FIGURE 1, whereby the grille guard 32 is caused to pivot about an axis extending through the pivot pins 40 whenever the operator's compartment 20 is tilted. Each rod 54 has one end pivotally connected to a cab hinge member 27 at a point vertically spaced above and horizontally to the rear of the pivotal axis of the operator's compartment 20 and its opposite end pivotally connected to a lug rigidly fastened to one of the vertical bars 33 of the grille guard 32 vertically spaced above and horizontally spaced to the rear of the pivotal axis of the grille guard 32. It will thus be appreciated that the grille guard pivots about the axis of the pivot pins 40 in unison with the operator's compartment 20 when the same is tilted about the axis of the pivot pins 29.

In operation, assuming the cab to be in its normally lowered position as shown in FIGURE 1 and it is desired to service the engine for any reason, the operator first grasps the handle 46 of the arm 45 and raises the same against the resilient action of the overcenter spring devices 50 to the position shown in FIGURE 5 wherein the latch members 44 are moved out of engagement with the latch pins 36 and are resiliently urged into engagement with the stop lugs 49. Thereafter the operator releases the cab latch means or mechanism 28 and the cab is manually tilted forwardly by the operator. Because of the operative connection between the operator's compartment 20 and the grille guard 32 provided by the rods 54, tilting movement of the opertator's compartment 20 effects simultaneous tilting of the grille guard 32 and thus the grille guard 32 does not interfere with the tilting operation of the operator's compartment. During the latter portion of the total travel of the operator's compartment 20 from the position shown in FIGURE 1 to the position shown in FIGURE 2, a pair of transversely spaced wear plates 55 fixed to the front wall section 23 of the operator's compartment 20 engage the latch members 44 whereby continued tilting of the operator's compartment 20 to the fully raised position shown in FIGURE 2 effects movement of the latch members out of abutting engagement with the stop lugs 49 sufficiently so that the overcenter spring devices 51 yieldably urge the latch members 44 into engagement with the stop lugs 48. As the operator's compartment 20 is swung toward its lowered normal position the grille guard 32 is swung clockwise as viewed in FIGURE 2 in unison therewith. Toward the end of such clockwise movement of the grille guard 32 the terminal ends 37 of the latch pins 36 engage the forward tip portions 56 of the latch members 44. The tip portions 56 are provided with curved cam surfaces 57 which have one end thereof terminating at the slots 47. Thus continued movement of the grille guard 32 to the position shown in FIGURE 1 causes the terminal ends 37 to ride on the cam surfaces 57 effecting a partial pivoting of the latch members 44 in a clockwise direction, as viewed in FIGURE 1, until the terminal ends 37 are in alignment with the slots 47 whereupon the overcenter spring means 51 yieldably urges the latch members 44 against the stop lugs 48 and the semi-cylindrical bottoms of the slot 47 into abutting engagement with the terminal ends 37 of the latch pins 36 to securely lock the grille guard 32 in its normal upright position.

The grille guard 32 may serve as a supporting frame for a street or highway maintenance implement. As an example, a snow plow 58 is shown mounted on the grille guard 32. The snow plow 58 includes a blade 59, a lower bar 60 having one end connected to the blade 59 adjacent the lower edge thereof and its opposite end pivotally connected to the grille guard 32. An extensible hydraulic piston and cylinder assembly 61 is operatively connected between the blade 59 and the lower bar 60 for adjusting the angle of the blade with respect to the ground. A support chain 62 has one end connected to the lower bar 60 and its opposite end connected to an arm 63 pivotally connected to an upper portion of the grille guard 32. An extensible hydraulic piston and cylinder assembly 64 has one end pivotally connected to the grille guard 32 and its opposite end pivotally connected to the arm 63 to rock the lower bar 60 in order to adjust the height of the blade 59 with respect to the ground. It is to be understood that implements other than snow plows may be mounted on the grille guard 32 without departing from the spirit and scope of the invention. It will also be appreciated that the entire weight of the grille guard 32 and any implement connected thereto is carried entirely by the chassis frame 10 and not by the operator's compartment 20. Furthermore, the thrust caused by the implement working against a load is transmitted directly to the chassis frame 10 and not to the vehicle operator's compartment 20.

The embodiment of the invention chosen for the purposes of illustration and description herein is that preferred for achieving the objects of the invention and developing the utility thereof in the most desirable manner, due regard being had to existing factors of economy, simplicity of design and the improvements sought to be effected. It will be appreciated, therefore, that the particular structural and functional aspects emphasized herein are not intended to exclude but rather to suggest such other adaptations and modifications of the invention as fall within the spirit and scope of the invention as defined in the appended claims.

What is claimed is:

1. In a motor vehicle having a longitudinally extending chassis frame and an operator's compartment mounted on the forward end of said chassis frame for pivotal movement about a transversely extending axis between a normally lowered position and a raised forwardly tilted position, said chassis frame including a transversely extending bumper disposed forwardly of the pivotal axis of said operator's compartment, the combination including said chassis frame and said operator's compartment, comprising, a substantially rectangular grille guard having a cylindrical latch pin projecting transversely outwardly from each transverse side thereof; means for pivotally connecting the lower end of said grille guard to said bumper for pivotal movement between a normally upright position and a forwardly inclined position, said means including a pair of transversely spaced bearing supports mounted on the top of said bumper; means operatively interconnecting said operator's compartment and said grille guard whereby pivotal movement of said operator's compartment effects simultaneous pivotal movement of said grille guard including a pair of transversely spaced links, each of said links having one end pivotally connected to said grille guard and its opposite end pivotally connected to said operator's compartment; and manually operable latch means carried by said chassis frame for releasably locking said grille guard in its normal upright position, said latch means including a transversely extending shaft mounted on said chassis frame for rocking movement about an axis vertically spaced above the pivotal axis of said grille guard, a latch member fixed to each end of said shaft having an open end slot, said latch members being movable between a first position wherein said latch pins are disposed within said slots when said grille guard is in its upright position and a second position wherein said latch members are moved out of locking engagement with said latch pin upon rocking of said shaft; an over-center spring device operatively interconnecting said latch members and said chassis frame for yieldably urging said latch members to their first and second positions; handle means connected to said shaft for imparting rocking movement thereto for moving said latch members between their first and second positions; and means carried by said operator's compartment and engageable with said latch members when in their second positions during pivotal movement of said operator's compartment from its normally lowered position to its raised forwardly tilted position for moving said latch members to their first positions.

2. In a motor vehicle having a longitudinally extending chassis frame and an operator's compartment mounted on the forward end of said chassis frame for pivotal movement about a transversely extending axis between a normally lowered position and a raised forwardly tilted position, said chassis frame including a transversely extending bumper disposed forwardly of and fixed with respect to the pivotal axis of said operator's compartment, the combination including said chassis frame and said operator's compartment, comprising, a substantially rectangular grille guard having a latch pin projecting transversely outwardly from each transverse side thereof; means for pivotally connecting the lower end of said grille guard to said bumper for pivotal movement between a normally upright position and a forwardly inclined position, said means including a pair of transversely spaced bearing supports mounted on the top of said bumper; means operatively interconnecting said operator's compartment and said grille guard whereby pivotal movement of said operator's compartment effects simultaneous pivotal movement of said grille guard including a pair of transversely spaced links, each of said links having one end pivotally connected to said grille guard and its opposite end pivotally connected to said operator's compartment; and manually operable latch means carried by said chassis frame for releasably locking said grille guard in its normal upright position, said latch means including a transversely extending shaft mounted on said chassis frame for rocking movement, a latch member fixed to each end of said shaft, said latch members being movable between a first position wherein said latch pins are engaged by and are locked to said latch members when said grille guard is in its upright position and a second position wherein said latch members are moved out of locking engagement with said latch pins upon rocking of said shaft, handle means connected to said shaft for imparting rocking movement thereto; and means carried by said operator's compartment and engageable with said latch members when in their second positions during pivotal movement of said operator's compartment from its normally lowered position to its raised forwardly tilted position for moving said latch members to their first positions.

3. In a motor vehicle having a longitudinally extending chassis frame and an operator's compartment mounted on the forward end of said chassis frame for pivotal movement about a transversely extending axis between a normally lowered position and a raised forwardly tilted position, said chassis frame including a transversely extending bumper disposed forwardly of and being fixed with respect to the pivotal axis of said operator's compartment, the combination including said chassis frame and said operator's compartment, comprising, a generally rectangular implement support frame, said support frame having a latch pin projecting transversely outwardly from each transverse side of said support frame; means for pivotally connecting the lower end of said support frame to said bumper for pivotal movement with respect to said chassis frame between a normally upright position wherein said support frame is disposed in a substantially transversely extending vertical plane and a forwardly inclined position; means operatively interconnecting said operator's compartment and said support frame whereby pivotal movement of said operator's compartment effects simultaneous pivotal movement of said support frame; and manually operable latch means carried by said chassis frame for releasably locking said support frame in its normal upright position, said latch means including a transversely extending shaft mounted on said chassis frame for rocking movement, a pair of latch members, each of said latch members having one end fixed to a respective end of said shaft and its opposite end provided with an open end slot adapted to have a respective latch pin inserted therein when said support frame is in its upright position and said latch members are in a first position, said latch members being movable to a second position upon rocking of said shaft whereby said latch pins are removed from said slots, handle means connected to said shaft for imparting rocking movement thereto; and means carried by said operator's compartment and engageable with said latch members when in their second positions during pivotal movement of said operator's compartment from its normally lowered position to its raised forwardly tilted position for moving said latch members to their first positions.

References Cited in the file of this patent

UNITED STATES PATENTS

| | | |
|---|---|---|
| 1,446,083 | Avery | Feb. 20, 1923 |
| 2,288,926 | Strader | July 7, 1942 |
| 2,537,553 | Schonauer | Jan. 9, 1951 |
| 2,637,586 | Meyer et al. | May 5, 1953 |
| 2,699,615 | Malvese | Jan. 18, 1955 |